United States Patent [19]

Kahn

[11] Patent Number: 5,802,412
[45] Date of Patent: Sep. 1, 1998

[54] MINIATURE PAN/TILT TRACKING MOUNT

[76] Inventor: Philip Kahn, 1451 Capuchino Ave., Burlingame, Calif. 94010

[21] Appl. No.: 827,843

[22] Filed: Apr. 11, 1997

Related U.S. Application Data

[60] Continuation of Ser. No. 549,912, Oct. 30, 1995, abandoned, which is a division of Ser. No. 449,257, May 24, 1995, Pat. No. 5,463,432, which is a continuation of Ser. No. 66,672, May 24, 1993, abandoned.

[51] Int. Cl.$^6$ .................................................. G03B 17/24
[52] U.S. Cl. .................. 396/427; 396/428; 352/53; 352/243
[58] Field of Search .......................... 396/419, 427, 396/428, 429; 352/243, 38, 44, 53

[56] References Cited

U.S. PATENT DOCUMENTS

| | | | |
|---|---|---|---|
| 4,283,766 | 8/1981 | Snyder et al. | 364/525 |
| 4,847,543 | 7/1989 | Fellinger | 318/628 |
| 4,945,367 | 7/1990 | Blackshear | 354/81 |
| 5,572,317 | 11/1996 | Parker et al. | 356/139.06 |

*Primary Examiner*—David M. Gray
*Attorney, Agent, or Firm*—Peters, Verny, Jones and Biksa; Janis Biska

[57] ABSTRACT

The invention is directed to a computer-controlled miniature pan/tilt tracking mount for the precise control of position, velocity, and acceleration of small payloads (e.g., a video camera). The invention consists of a motorized rotational tilt axis mounted atop a motorized rotational pan axis. For both axes, a worm gear mounted upon the motor shaft bidirectionally rotates a worm wheel mounted upon the orthogonal load axis shaft. A large ratio of motor size to armature weight provides high relative torque, speed, and accuracy. The worm gears provide compact reduction with minimal backlash and they can hold position without energized motors to conserve power for battery-operated uses. The invention includes integrated motor drive power electronics and microcontroller execution of host computer commands to effect precise control of pan/tilt mount speed, acceleration, position, configuration, and motor and electronics power consumption. Superior motor drive capabilities are achieved by the use of pulse-width modulation (PWM).

15 Claims, 3 Drawing Sheets

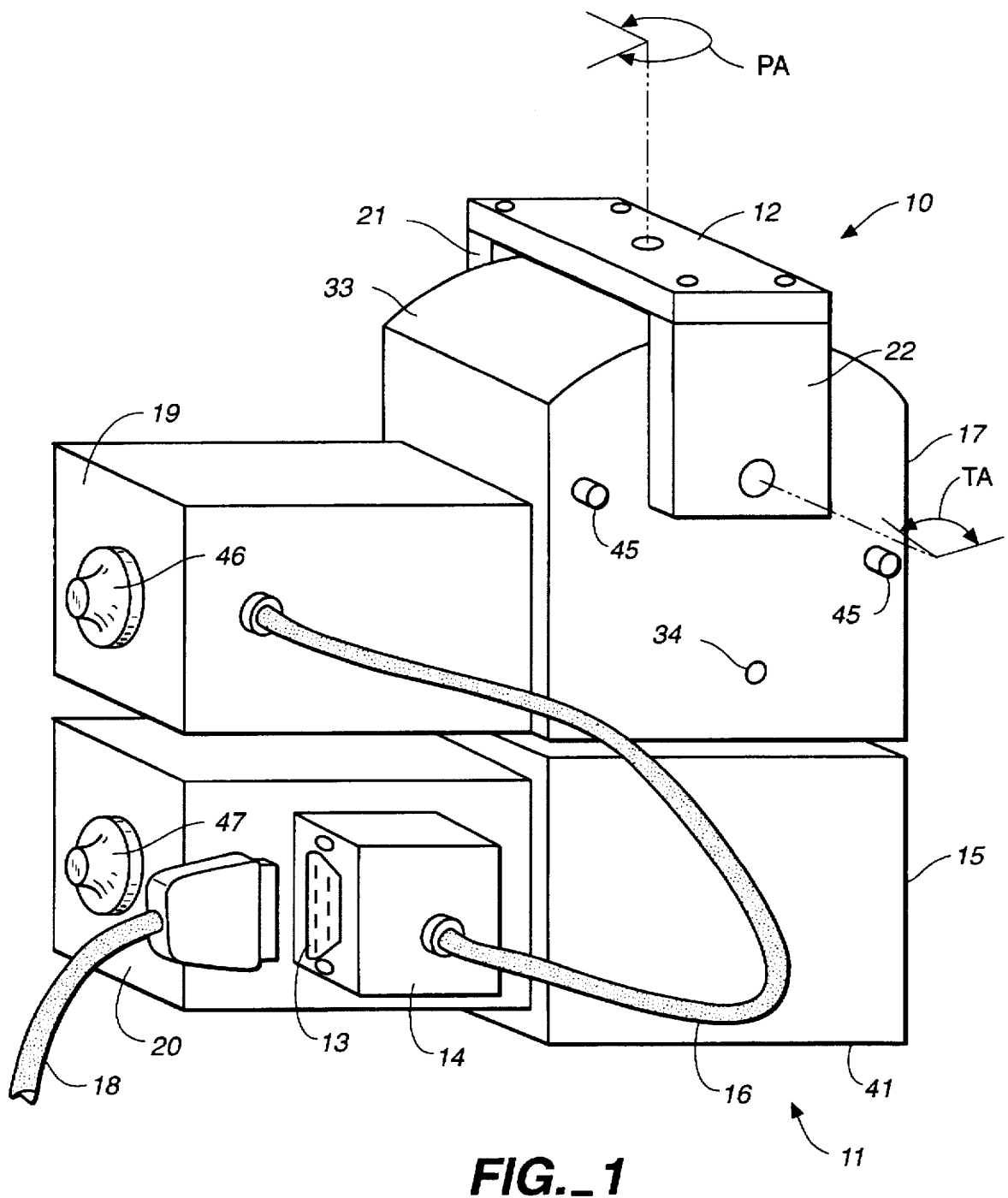
FIG._1

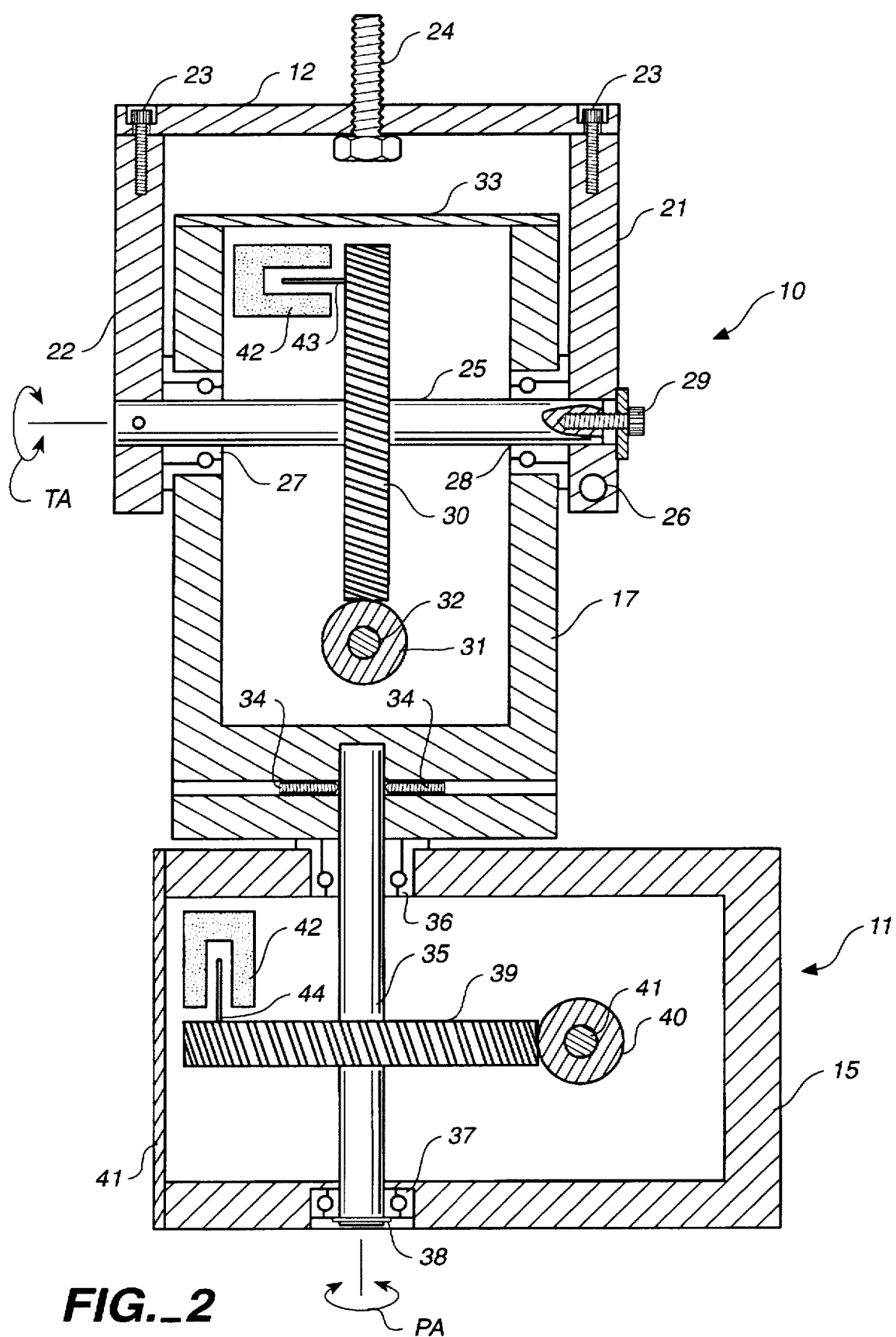
FIG._2

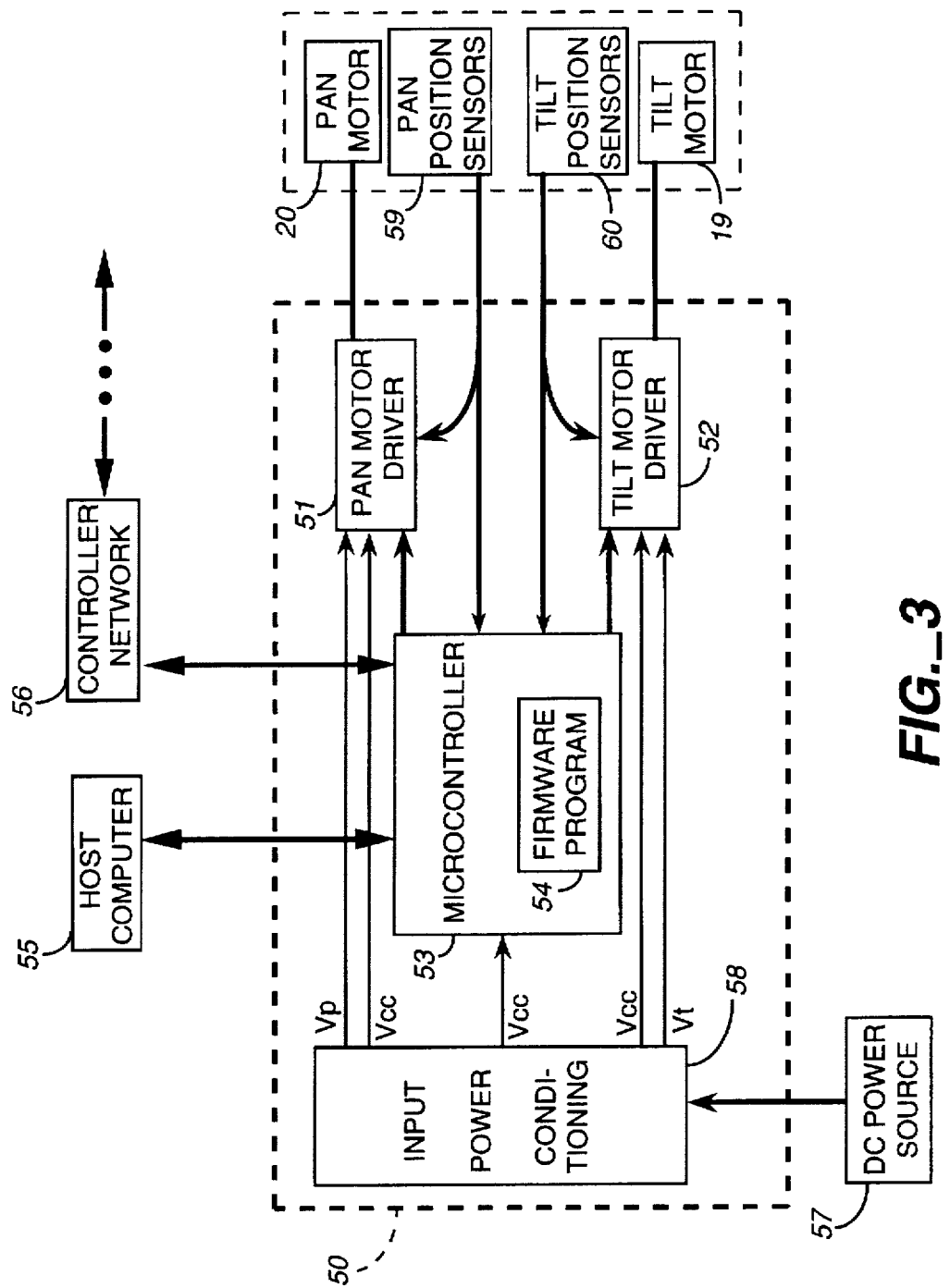
FIG._3

MINIATURE PAN/TILT TRACKING MOUNT

This application is a continuation of application Ser. No. 08/549,912, filed Oct. 30, 1995, abandoned, which was a divisional application of application Ser. No. 08/449,257, filed May 25, 1995, which issued as U.S. Pat. No. 5,463,432 on Oct. 31, 1995, which was a continuation of application Ser. No. 08/066,672, filed on May 24, 1993, abandoned.

FIELD OF THE INVENTION

The invention relates to a miniature motorized apparatus, known as a pan/tilt tracking mount, that provides for precise and high-speed rotation and tilting of mounted payloads in response to host computer generated commands.

BACKGROUND OF THE INVENTION

Highly accurate and fast computer-controlled pan/tilt mounts have been used in the field of tracking for decades (e.g., for missile tracking U.S. Pat. No. 3,559,937, target tracking, weapon/gun mount). Tracking mounts provide for precise and fast computer control of pan/tilt position, speed and acceleration. These tracking mounts have been intrinsically complex and costly since they typically carry large payloads (e.g., greater than 20 pounds), and they position with great accuracy (e.g., 1 second arc) and speed (e.g., over 300°/second). The present pan/tilt tracking mount invention provides a hitherto unavailable capability for applications that have small payloads (e.g., less than 10 pounds) and which require a miniature and compact mount that can be simply controlled, and is particularly well-suited for low cost manufacture.

Recent advances in the fields of image processing, computer vision and robot vision have shown that active control of sensor pan/tilt position can facilitate and simplify computations that support a wider range of activity than a passive sensor. Advances in low cost and powerful digital signal processors (DSP), accurate and miniature solid state cameras, sensor processing algorithms, and robotics have made sensor-based control of pan/tilt position applicable to a wide range of uses, though the lack of a suitable, low cost pan/tilt mount has retarded advancements in related fields and applications. The invention disclosed herein provides the necessary tracking mount capabilities hitherto unavailable to these fields.

Motorized pan/tilt mounts have achieved widespread use in the fields of surveillance and security (e.g., U.S. Pat. Nos. 4,673,268 and 4,937,675). Often used outdoors or under harsh conditions, these mounts are often liquid-proof. These pan/tilt mounts typically achieve medium to large payload capacity with small motors by the use of large mechanical speed reductions, thus, they are generally too slow for most tracking applications. Though pulse-width modulation (PWM) and constant-current motor drivers achieve better motor performance (e.g., better acceleration, higher switching rate, better dynamic torque), most prior art security motor drivers use simpler voltage drivers due to their simplicity and historically lower cost, though advances in single chip, high-power microelectronics have made PWM constant-current drives economically competitive. Precision is not typically inherent in the prior art designs, since their mechanical speed reductions are frequently subject to backlash (e.g., as from spur gear trains), slippage (e.g., as from belt drives), and other mechanical effects. Small solid-state cameras have created a need for miniature mounts, since unobtrusiveness is desirable for surveillance and security, though current mounts are still considerably larger than their cameras, and they are not well-suited for miniature and ultraminiature realization. In addition, human and very simple automated pan/tilt controls in the prior art (e.g., joystick operation, or fixed scanning and position presets) are not generally amenable to integrated computer control of mount position in response to changes in sensor input. The pan/tilt invention disclosed herein provides hitherto unavailable capabilities in the surveillance and security fields due to its integrated computer control suitability for miniaturization/ultraminiaturization and low cost manufacture, it does not impose an upright mounting requirement (e.g., it can be mounted upside down from the ceiling for store surveillance), and its advanced tracking mount features (e.g., speed, precision, computer-control) facilitate novel surveillance and security strategies for control and computation.

SUMMARY OF THE INVENTION

The present invention is a miniature pan/tilt tracking mount for small payloads (e.g., less than 10 pounds) that provides capabilities not available in prior art in terms of its miniature size (e.g., 2.98"×5.13"×3.55"), positional accuracy (e.g., 3 minutes arc), high speed (e.g., slew rates over 300°/second), precise control of speed and acceleration, suitability for liquid resistant realization, gravity independent mounting (e.g., it can be mounted upside-down), integrated microprocessor control and interface, and particular suitability for low cost manufacture. The invention consists of a motorized rotational tilt axis mounted atop a motorized rotational pan axis. For both axes, a worm gear mounted upon the motor shaft bidirectionally rotates a worm wheel mounted upon the orthogonal load axis shaft. An advantage over the prior art is provided by the invention's small size and its high relative torque, speed, and accuracy that are achieved by a large ratio of motor size to armature weight, and the use of a single worm gear per axis that provides compact and flexible reduction while providing minimal backlash and the ability to hold position without energized motors to conserve power for battery-operated uses (i.e., worm pressure angles can be selected to prevent gear backdriving).

The invention includes motor drive power electronics and microcontroller execution of host computer commands to effect precise control of pan/tilt mount speed, acceleration, position, and configuration. Upon reset, the microcontroller precisely moves the mount to a repeatable and known "home" position using electrical sensor feedback from the mount (e.g., limit switch, encoder feedback). Precise motor rotation relative to the home position is maintained by the microcontroller (e.g., by step count for open-loop stepper control, or, incremental encoder feedback for closed-loop stepper or DC servomotor control). Superior motor drive capabilities are achieved by the use of pulse-width modulation (PWM) and constant current driving of motor windings.

BRIEF DESCRIPTION OF THE DRAWINGS

FIG. 1 shows an elevated perspective view of an embodiment of the pan/tilt mount invention.

FIG. 2 shows a detailed cross-sectional front view of an embodiment of the pan/tilt mount invention.

FIG. 3 shows a block schematic of the major functional pan/tilt mount controller components and connections.

DETAILED DESCRIPTION

FIG. 1 shows an elevated perspective view of a preferred embodiment of the pan/tilt mount invention. The mount consists of a tilt assembly 10 mounted atop a pan assembly 11. A payload (e.g., a camera) secured to the load mounting plate 12 is rotated by the tilt assembly 10 and its tilt motor 19 through a tilt angle TA of at least 100 degrees. The tilt assembly 10 is rotated by the pan assembly 11 and its pan motor 20 through a pan angle PA. When a tilt assembly cable 16 is used to electrically connect the tilt assembly 10 to the pan assembly 11, the pan angle PA is at least 330 degrees. In an alternative embodiment, the tilt assembly cable 16 may be replaced with a pancake slip ring (e.g., model 1062 from Fabricast Incorporated or model SR2300 from Maurey Instrument Corporation) mounted upon the pan axis shaft 35 between the tilt housing 17 and pan housing 15, in which case the pan angle PA has unlimited rotation through a full 360 degrees. Knobs 46 47 mounted on the motor shafts provide for manual operation of the mount. All pan/tilt mount electrical connections terminate in an electrical connector 13 mounted within a connector housing 14 that is secured to the pan housing 15. A control cable 18 electrically connects the pan/tilt mount to the controller to be detailed hereinafter. Threaded mounting holes (not shown) in the pan housing 15 provide for bottom or front mounting to a support (e.g., tripod, robot).

FIG. 2 shows a detailed cross-sectional front view of an embodiment of the pan/tilt mount. A standard camera #¼–20 load mounting bolt 24 is provided to secure a payload (e.g., video camera) to the load mounting plate 12. The mounting plate 12 is secured to the left tilt bracket 21 and right tilt bracket 22 by retaining screws 23 inserted through recessed loose fit holes in the mount plate 12 that allow for minor adjustment of tilt bracket 21 22 spacing. The retaining screws 23 may be removed to customize the load mounting plate 12. The right tilt bracket 22 is secured to the tilt axis shaft 25 (e.g., by a shaft pin). The left tilt bracket 21 is slotted (not shown) to form a clamp secured to the tilt shaft 25 by the tightening of a clamp screw 26 in order to provide for tilt shaft 25 removal and tilt bracket 21 22 spacing adjustment. The tilt shaft 25 is supported by two flanged bearings 27 28, ball bearings in a preferred embodiment, that are recessed into the tilt housing 17. Resistance against liquid and contaminants is enhanced by the use of shielded bearings and O-rings between the left 21 and right 22 brackets and the tilt housing 17. In a preferred embodiment, a tilt axis tension adjustment screw and washer 29 threaded into the axial center of the tilt axis shaft 25 precisely adjusts the tilt bracket 21 22 spacing to achieve bearing 27 28 preloading and tilt mount rigidity prior to the tightening of the clamp screw 26 and mount plate screws 23. A worm wheel 30 secured to the tilt axis shaft 25 engages a worm gear 31 secured to the tilt motor shaft 32. The tilt motor 19 is secured to the tilt housing 17 by retaining screws inserted through loose fit holes (not shown) that allow for minor adjustment to achieve tight engagement of the worm wheel 30 and gear 31. A cover 33 is secured to the tilt housing 17 to protect internal mechanisms from contaminants and liquids. As shown in FIG. 1, mechanical stop pegs 45 can be inserted into the tilt housing 17 which engage the right tilt bracket 22 to avoid tilt angles TA that interfere with the pan motor 20.

As shown in FIG. 2, the tilt assembly 10 is secured to the pan axis shaft 35 by two opposing set screws 34 inserted in the tilt housing 17. The pan shaft 35 is supported by a flanged 36 and plain 37 bearing, ball bearings in a preferred embodiment, that are recessed into the pan housing 15. A shaft retaining clip 38 secures one end of the pan shaft 35, both of which are recessed with the plain bearing 37 to facilitate mounting to the pan housing 15 bottom. Resistance against liquids and contaminants is enhanced by the use of shielded bearings, an O-ring (not shown) between the tilt 17 and pan 15 housings, and sealing (e.g., by metal tape) of the recessed plain bearing 37 and retaining clip 38. The pan axis drive is analogous to the tilt axis drive. A worm wheel 39 secured to the pan axis shaft 35 engages a worm gear 40 secured to the pan motor shaft 35. As for the tilt axis, loose fit motor mount screw holes (not shown) provide for worm wheel 39 and gear 40 tensioning. When a tilt assembly cable 16 is used, rather than a slip ring as described earlier, a pan mechanical stop (not shown) is desirable to avoid cable damage. A mechanical pan axis stop is simply realized by inserting a dowel pin into the bottom front center of the tilt housing 17 and another opposing dowel pin is inserted into the top back center of the pan housing 15, such that these pins are inserted at the same radius about the pan shaft 41, and the exposed pins engage one another without contacting the opposing assembly housing. A cover 41 secured to the pan housing 15 protects against contaminants and liquids.

The motor and mount position sensor embodiment employs stepping motors and precision limit switches to accurately and repeatably control pan/tilt mount position. Limit positions are detected by the use of vanes 43 44 mounted with each worm wheel 30 39 that interrupts a light beam in a slotted optical limit switch 42. High limit position accuracy and repeatability is achieved by the use of a transmissive photoIC (e.g., Omron EE-SX493) possessing a narrow slot (e.g., 2 mm), narrow aperture (e.g., 0.2 mm), precise voltage control, thermal correction, and a Schmitt switching circuit. In this configuration, each motor can be stepped open-loop relative to the established mount home positions. This embodiment provides for low cost manufacture by omitting the need for more expensive encoders and drive controls.

To avoid classical problems associated with open-loop motor control, an alternative embodiment can include encoders to establish closed-loop motor control. This embodiment uses dual shaft motors to allow simple mounting of motor shaft encoders (e.g., an incremental optical quadrature encoder such as the HP HEDS-5500). Mechanical stops can be detected by the encoders as motor stalls and the limit switches 42 and vanes 43 44 can be omitted, though the preferred embodiment retains them for added safety and flexibility. Another alternative embodiment, though usually substantially more expensive, can replace the stepping motors with encoders and DC servomotor controls to achieve higher motor torque to weight ratios and better dynamic torque characteristics. Because DC motors generally have smaller diameters than comparable stepping motors, and the overall pan/tilt mount dimensions are substantially affected by motor diameter, DC motors can provide a substantially more compact embodiment.

FIG. 3 shows a block schematic of the major functional pan/tilt mount controller 50 components and connections. A pan motor driver 51 energizes the pan motor 20 and a tilt motor driver 52 energizes the tilt motor 19. A microcontroller 53 executing a firmware program 54 controls motor drivers 51 52, processes pan 59 and tilt position sensor 60 input, host computer 55 command execution and feedback, and communications with a controller network 56. Input power conditioning 58 filters the input from a DC source 57 and supplies pan motor power $V_p$, tilt motor power $V_t$, and logic power $V_{cc}$.

In the current embodiment, which uses stepping motors as described earlier, a single chip power IC (UDN2917EB) is used for each axis driver 51 52. These compact drivers incorporate a dual full bridge driver, pulse-width modulation (PWM), current sensing for constant current driving, digital control providing four level current control, voltage reference control of current, internal parasitic diodes, high current and voltage capacity, and thermal protection shutdown. PWM is the preferred motor driving technique since it provides for superior motor and driver performance, efficient control of current consumption, and it can accept a wide range of input voltages (e.g., 11-45VDC) that provides for flexible DC power source 57 selection which allows simpler and more economical installation. Digital control of current level is used to decrease winding current to achieve more consistent motor torque for half-steps in which multiple windings are simultaneously energized, and current level can be controlled by host computer 55 commands that allow user programs to conserve mount power consumption (e.g., as in battery-operated applications). In an alternative embodiment, a digital to analog converter can be used by the microcontroller 53 to adjust the voltage reference control of current, thereby providing for microstepping in order to provide higher rotational resolution and reduce motor cogging. As discussed earlier, an alternative embodiment can use DC servomotors in place of stepping motors. In this case, the microcontroller 53 can implement servocontrol in its firmware program 54 using a single UDN2917EB power driver chip above-described with the addition of motor shaft position encoder input 59 60. Alternatively, simpler firmware 54 and improved motor performance may be achieved at higher cost by the use of highly integrated DC servomotor control chips as replacement PWM drivers 51 52 (e.g., the HP HCTL-1100).

In the current embodiment, an MC68HC11-based microcontroller S3 from Coactive Aesthetics in San Francisco, Calif. (model GCB11) was used. The firmware program 54 digitally controls the motor drivers 51 52, performs mount initialization and homing, processes host computer 55 commands and feedback via an RS-232 port, and capability is provided for command and feedback via an RS-485 multi-drop controller network 56. When input DC power 57 is applied, the program 54 performs a system reset by initializing internal data structures, verifying mount defaults stored in its EEPROM, commanding the motors to move until the limit positions are identified, and moving the mount to its home position. The program 54 processes commands from and returns status to the host computer 55 or controller network 56 for mount position, speed, acceleration, upper allowable speed limit, starting motor velocity, unit reset, positional resolution, position limits, and mount parameter defaults read from EEPROM upon power up. In addition, commands and queries are provided to allow the control of motor power mode when in-transit and stationary. These modes include high power mode (energized windings at rated current), regular power mode (full steps use rated winding current, half steps use 66% rated winding current), low power mode (windings use 33% of the current used in regular power mode), and when stationary a motor power off mode is provided. Executed position and speed commands override previous position and speed commands that may not have yet completed (i.e., on-the-fly position and speed changes are provided), and an await completion command is provided to allow executing position and speed commands to complete before new commands are processed. In addition, two command execution modes are provided. In immediate mode, position and speed commands are executed immediately. In slaved mode, position and speed are executed upon an await completion command in order to allow simultaneous commencement of pan and tilt axis command execution.

In interactive command mode, pan/tilt mount commands are specified by ASCII strings which are well suited for interactive user control from a terminal. Alternatively, a binary command mode is provided to provide a more compact command format that a program executing on the host computer can use to achieve significant improvements in host/controller communications bandwidth. For example, binary mode commands typically use less than one third the number of bytes required by the interactive ASCII mode, so a tripling of bandwidth can be obtained (e.g., binary mode on a 9600 baud RS-232 link can achieve command transfer rates that an interactive ASCII mode would require over 28.8 K baud to achieve).

The program 54 performs interrupt-driven control of motor drivers 5S 52 to precisely control pan 20 and tilt 19 motor acceleration, deceleration, velocity, and current levels. As described earlier, the current embodiment uses stepping motors. Each motor has an associated software routine that is activated by an interrupt generated by the microcontroller 53 parallel timing circuitry, and this routine controls its associated motor driver 51 52 to affect motor winding polarity and current, updates motor state variables, and schedules the time at which the next interrupt should again activate the routine. These motor routines run at a higher priority than the main program which processes host commands and queries in order to achieve precise motor speed control that is independent of host communications traffic. For speeds at or below the starting motor velocity, the stepping motor is half-stepped at the commanded velocity until the desired position is attained. For speeds above the starting motor velocity, the motor is accelerated from the starting velocity to the desired slew rate and then decelerated to the desired position. For velocities above the starting rate, full steps are used except when a half step is required to start from or end at a half-step position. Linear acceleration was used since it has low computational requirements (a pre-computed table may be indexed to determine step time intervals). Preferred embodiments can use more computationally intensive acceleration methods that may provide better dynamic performance (e.g., S-curve acceleration). The current embodiment, and alternative embodiments described earlier, may use alternative motor controls as are customary and applied.

The following are some exemplary parameters showing pan/tilt performance and materials for the current embodiment.

Maximum payload: 5 pounds
Maximum velocity: over 300°/second
Resolution: 3.086 arc minutes
Tilt range: greater than 100°
Pan range: greater than 330°
Mount dimensions: 2.98"(width)×5.13"(height)×3.55" (depth)
Pan and tilt motor, Oriental Motor, PK245-01BA 1.8°; 46 oz/in, hybrid 2-phase stepping motor
Worm gear reduction: 17.5:1
Motor driver: Allegro Microsystems, UDN2917EB
  Dual full H-bridge, PWM constant current bipolar drive
Input Voltage:
  Motor power: 11-45VDC unregulated
  Logic power: 8-30VDC unregulated (uses internal 5VDC switcher regulator), or, 5VDC regulated
Power Consumption:
  Full-power mode: 16 W continuous peak
  Low-power mode: 7.5 W continuous peak
  Holding power off mode: less than 1 W The following are some exemplary host computer 55 commands executed by the firmware program 54 to control pan/tilt mount operation. <axis> is the character "T" for the tilt axis or the character "P" for the pan axis.

Pan/tilt mount axis commands:
General form: <axis><command><value><delim>→[<status>]
Go to position: <axis>P<position><delim>→[<status>]
Go to offset position: <axis>O<relative position><delim>→[<status>]
Set desired speed: <axis>S<positions/sec><delim>→[<status>]
Set acceleration: <axis>A<positions/sec2><delim>|[<status>]
Set speed bounds: <axis>[<upper>|<lower>]<positions/sec><delim>→|<status>]
Move power mode:<axis>M[<hi power>|<reg power><|<lo power>]<delim>→|<status>]
Hold (stationery) power mode:<axis>H[<reg power>|<lo power>|<power off>]<delim>→[<status>]
Queries:
  General form: <axis><command><delim>→<query answer>Axis Control Commands become queries when the <value>argument is omitted.
Resolution: <axis>R<delim>→<arc seconds per position>
  Position bounds: <axis>[<min>|<max>]<delim>→<boundary position>
Unit Commands:
  Command menu: ?<delim>→<menu>
  Await completion: A<delim>→<status>
  Reset unit: R<delim>→[<status>]
  Immediate mode: I<delim>→[<status>]
  Slaved mode: S<delim>→[<status>]
  Defaults used at power up (saved in EEPROM): D[<save current settings>|<restore prior settings>|<restore factory settings>]<delim>→[<status>]

While the invention has been described in connection with specific embodiments thereof, it will be understood that it is capable of further modifications. The claims are intended to cover any variations, uses or adaptation of the invention following, in general, the principles of the invention, and including such departures from the present disclosure as come within known and customary practice within the art to which the invention pertains.

I claim:

1. A method for one or more host computers to dynamically control and query the precise position, speed, and state of one or more pan/tilt mounts, comprising the steps of:

providing a pan/tilt controller, including a dedicated embedded processor for executing real-time pan/tilt control functions and processing of communications and commands from said one or more distinct and separate host computers, said embedded pan/tilt controller processor sharing no computational resources with said one or more host computers;

providing a motorized pan/tilt mount with minimal drivetrain backlash, motors and gearing that can precisely rotate the pan and tilt axes over a wide speed and acceleration range, and incorporating pan and tilt limit position detection sensors that are precise and highly repeatable; said pan-tilt mount is electrically connected to the pan/tilt controller, regulating either the current or voltage to windings of a pan motor and a tilt motor of said pan/tilt mount using said controller, and said controller receiving a set of pan and tilt position sensor feedback signals from said pan/tilt mount;

communicating between each of a set of one or more pan/tilt controllers and said one or more host computers, where each said host computer electrically is connected by a standard digital communications interface to provide a bi-directional communications link to each said pan-tilt controller; wherein each of said one or more host computers can issue command signals to said controller to effect desired pan/tilt mount movement, and each of said one or more host computers can issue command signals to said one or more controllers to query current pan/tilt mount movement, position, status, and configuration;

calibrating absolute pan and tilt mount positions relative to a pan/tilt mounting point so that absolute pan and tilt positions may be precisely repeated; wherein said calibrating step is initiated by at least one of the following events: upon power being supplied to said pan-tilt controller, upon receiving a calibrate command signal from at least one of said one or more host computers;

setting precisely the absolute rotational speed and direction for pan and tilt movements according to a setting command signal received by said controller from at least one of said one or more host computers such that said controller can precisely and repeatably position the pan and tilt axes relative to said pan/tilt mounting point;

controlling the movements of said pan and tilt mount independently and concurrently according to signals from at least one of said one or more host computers and the particular pan/tilt controller of said one or more pan/tilt controllers associated with said pan and tilt mount;

parsing and executing incoming host computer commands by said one or more controllers concurrent with the execution by said controller of pan-tilt mount movements; and executing position and speed command signals received by said pan/tilt controller from one of said one or more host computers without delay such that said command signals preempt the instructions of previous position and speed command signals that may not have yet completed.

2. The pan/tilt controller as in claim 1, further comprising the step of:

controlling the timing of when said one or more pan/tilt controllers begin executing desired pan/tilt actions to achieve coordinated multiaxis movements by said one of said one or more host computers.

3. The pan/tilt controller as in claim 2, further comprising the step of:

querying said pan/tilt controller to determine the current rotational speed and current absolute position of the pan and tilt axes even when said pan or tilt movements are in progress, using said one of said one or more host computers.

4. The pan/tilt controller as in claim 3, further comprising the step of:

providing one of said one or more host computers with communications feedback from said pan/tilt controller when a desired pan position has been attained when commanded to provide such communications feedback by such a one of said one or more host computers.

5. The pan/tilt controller as in claim 3, further comprising the step of:

providing one of said one or more host computers with communications feedback from said pan/tilt controller when a desired tilt position has been attained when commanded to provide such communications feedback by such a one of said one or more host computers.

6. The pan/tilt controller as in claim 3, further comprising the step of:

providing one of said one or more host computers with communications feedback from said pan/tilt controller when a desired pan position and a desired tilt position has been attained when commanded to provide such communications feedback by such a one of said one or more host computers.

7. The pan/tilt controller as in claim 3, further comprising the step of:

providing one of said one or more host computers with communications feedback from said pan/tilt controller when a desired pan speed has been attained when commanded to provide such communications feedback by such a one of said one or more host computers.

8. The pan/tilt controller as in claim 3, further comprising the step of:

providing one of said one or more host computers with communications feedback from said pan/tilt controller when a desired tilt speed has been attained when commanded to provide such communications feedback by such a one of said one or more host computers.

9. The pan/tilt controller as in claim 3, further comprising the step of:

providing one of said one or more host computers with communications feedback from said pan/tilt controller when a desired pan speed and a desired tilt speed has been attained when commanded to provide such communications feedback by such a one of said one or more host computers.

10. The pan/tilt controller as in claim 3, further comprising the step of:

precisely setting of a desired pan and tilt rotational speed as an offset from the current pan or tilt speed by the pan/tilt controller upon receiving a command signal from said one or more host computers.

11. The pan/tilt controller as in claim 1, further comprising the step of:

precisely setting of a desired pan and tilt rotational position as an offset from the current pan or tilt position by the pan/tilt controller upon receiving a command signal from said one or more host computers.

12. The pan/tilt controller as in claim 1, further comprising the steps of:

precisely setting of a desired pan and tilt rotational speed as an offset from the current pan or tilt speed by the pan/tilt controller upon receiving a command signal from said one or more host computers, and precisely setting of a desired pan and tilt rotational position as an offset from the current pan or tilt position by the pan/tilt controller upon receiving a command signal from said one or more host computers.

13. The pan/tilt controller as in claim 1, further comprising the step of:

precisely controlling changes in pan and tilt speed using said pan-tilt controller vary a rate of pan acceleration and tilt acceleration, according to command signals from said one or more host computers.

14. The pan/tilt controller as in claim 1, further comprising the step of:

varying the current levels applied to pan/tilt mount pan motor windings and tilt motor windings by said pan/tilt controller, according to command signals from said one or more host computers;

wherein the current applied to a stationary pan/tilt mount pan motor winding an be set independent from the current applied to a pan/tilt mount motor pan motor winding when the pan motor is turning, wherein the current applied to a stationary pan/tilt mount tilt motor winding can be set independent from the current applied to a pan/tilt mount motor tilt motor winding when the tilt motor is turning, and wherein said one or more host computers can command said pan/tilt/controller to provide different magnitudes of motor winding currents to said pan motor and to said tilt motor when said motors are stationary as compared to when said pan and said tilt motors are turning.

15. The pan/tilt controller as in claim 1, further comprising the step of:

assigning a unique identifier to each pan/tilt controller, such that a first of said one or more host computers can communicate command signals and receive feedback signals from a selected controller, wherein said first of said one or more host computers may broadcast command signals to one or more of said one or more pan/tilt controllers.

* * * * *